United States Patent [19]

Oda et al.

[11] Patent Number: 5,153,732
[45] Date of Patent: Oct. 6, 1992

[54] ELECTRONIC STILL CAMERA WHICH REDUCES THE INFLUENCE OF SMEAR AND DARK CURRENT

[75] Inventors: Kazuya Oda; Yoshiki Kawaoka; Masahiro Konishi, all of Tokyo, Japan

[73] Assignee: Fuji Photo Film Co., Ltd., Kanagawa, Japan

[21] Appl. No.: 655,868

[22] Filed: Feb. 15, 1991

[30] Foreign Application Priority Data

Feb. 16, 1990 [JP] Japan ............................. 2-33957
Feb. 23, 1990 [JP] Japan ............................. 2-40937

[51] Int. Cl.⁵ .......................................... H04N 5/335
[52] U.S. Cl. ........................ 358/213.15; 358/213.16; 358/213.11; 358/213.24
[58] Field of Search .................. 358/213.11, 213.15, 358/213.16, 213.19, 213.24, 167, 221, 213.13; 357/24 LR; 377/60, 63, 58

[56] References Cited

U.S. PATENT DOCUMENTS

| | | | |
|---|---|---|---|
| 4,496,982 | 1/1985 | Levine | 358/221 |
| 4,578,707 | 3/1986 | Ozawa et al. | 358/212 |
| 4,580,168 | 4/1986 | Levine | 358/213.24 |
| 4,700,231 | 10/1987 | Matsumoto | 358/213.12 |
| 4,777,519 | 10/1988 | Oshima | 357/24 |
| 4,985,775 | 1/1991 | Murayama et al. | 358/213.13 |
| 5,003,398 | 3/1991 | Suzuki | 358/209 |
| 5,049,996 | 9/1991 | Kaneko et al. | 358/213.13 |

Primary Examiner—Michael Razavi
Assistant Examiner—Tuan V. Ho
Attorney, Agent, or Firm—Birch, Stewart, Kolasch & Birch

[57] ABSTRACT

An electronic still camera uses a charge coupled solid-state image pickup device and reads out pixel signals from photoelectric conversion elements by separating the photoelectric conversion elements into a number of fields. In a first embodiment, the elements are separated into k number of fields and an empty reading operation of the vertical and horizontal charge transfer paths are implemented without field shifting pixel signals from the elements to the transfer paths to thereby preserve the pixel signals in the elements. Accordingly, smear contents are removed and the influence of dark current is made uniform to prevent the occurrence of flicker. In a second embodiment, an empty reading operation of the vertical and horizontal charge transfer paths is implemented just after exposure. After the empty reading operation, normal field scanning and reading operation is restarted from the pixel signals corresponding to the field where the field shifting operation is stopped. Accordingly, smear contents are removed and dark current is made uniform.

20 Claims, 13 Drawing Sheets

ELECTRONIC STILL CAMERA WHICH REDUCES THE INFLUENCE OF SMEAR AND DARK CURRENT

BACKGROUND OF THE INVENTION

1. Field of the Invention

The present invention relates to an electronic still camera for photographing a still picture by using a charge coupled solid-state image pickup device, and particularly relates to an electronic still camera for photographing a high-definition still picture obtained by reducing the influence of smear and dark current occurring in the charge coupled solid-state image pickup device and for producing a high-definition still picture without flicker.

2. Description of Background Art

Heretofore, conventional electronic still cameras have used a charge coupled solid-state image pickup device having vertical resolution of a level in accordance with a standard television system, such as an NTSC television system, with 525 scanning lines.

However, a conventional solid-state pickup device cannot attain the high vertical resolution suitable for a highquality television system which has a vertical resolution of about twice as much as that of an NTSC television system. Therefore, development of an electronic still camera using a solid-state image pickup device having a larger number of pixels has been desired.

The inventors in this application have investigated and developed an electronic still camera using an interline transfer charge coupled solid-state image pickup device having vertical direction pixels increased in number by about twice that of the conventional device, by which pixel signals from all the pixels are read by 4 field scanning operations.

The structure of the developed solid-state image pickup device is described with reference to FIG. 11. In the drawing, photodiodes A1, B1, A2 and B2 are arranged in the form of a matrix of 800,000 pixels having 1000 rows in the vertical direction X and 800 columns in the horizontal direction Y. Vertical charge transfer paths $l_1$ to $l_m$ are formed adjacent to the respective columns of the photodiodes. A horizontal charge transfer path HCCD is formed in terminal portions of the respective vertical charge transfer paths $l_1$ to $l_m$. Pixel signals are read out successively in time series in synchronism with the scanning timing through an output amplifier AMP formed in a terminal portion of the horizontal charge transfer path HCCD.

The arrangement of the photodiodes is defined so that the photodiodes A1 arranged in the (4n−3)-th row (n being a natural number) correspond to the first field, the photodiodes B1 arranged in the (4n−2)-th row correspond to the second field, the photodiodes A2 arranged in the (4n−1)-th row correspond to the third field, and the photodiodes B2 arranged in the 4n-th row correspond to the fourth field. In short, the photodiodes are operated so as to read out all the pixel signals of one picture by carrying out four field scanning/reading operations in order.

A series of image pickup operations from an exposure operation to a pixel signal scanning and reading operation is described with reference to the timing chart of FIG. 12. The solid-state image pickup device performs a field scanning and reading operation in synchronism with the vertical synchronizing signal VD which expresses a field scanning period (1V). In short, in FIG. 12, a field shifting operation for every field is carried out in synchronism with the time of level inversion of the vertical synchronizing signal VD to an "H" level. (The period in which the level of each of the signals FS1, FS2, FS3 and FS4 is turned to an "H" level is a field shifting period for each field.) Thus, pixel signals corresponding to each field are read out in a 1V period before the level of the vertical synchronizing signal VD is turned to an "H" level again.

When, for example, the shutter release button is pushed at a point of time $t_1$ in the second field scanning period (between $t_0$ to $t_2$) as shown in FIG. 12 to perform exposure for a predetermined shutter period (represented by "H" in the drawing), the operation of reading pixel signals is started from the field scanning and reading period just after the end of the exposure. In short, pixel signals $q_{A2}$ generated in the photodiodes A2 corresponding to the third field are fieldshifted to the vertical charge transfer path side in a period in which the level of the signal FS3 is turned to an "H" level at the point of time $t_2$. Then, the vertical charge transfer paths $l_1$ to $l_m$ and the horizontal charge transfer path HCCD read out the pixel signals $q_{A2}$ in time series in synchronism with a predetermined drive signal to carry out the third field scanning and reading operation in a period between $t_2$ and $t_3$.

Then, pixel signals $q_{B2}$ generated in the photodiodes B2 corresponding to the fourth field are field-shifted to the vertical charge transfer path side in a period in which the level of the signal FS4 is turned to an "H" level at the point of time $t_3$. Then, the vertical charge transfer paths $l_1$ to $l_m$ and the horizontal charge transfer path HCCD read out the pixel signals in time series in synchronism with a predetermined drive signal $q_{B2}$ to carry out the fourth field scanning and reading operation in a period between $t_3$ and $t_4$.

Then, pixel signals $q_{A1}$ generated in the photodiodes A1 corresponding to the first field are field-shifted to the vertical charge transfer path side in a period in which the level of the signal FS1 is turned to an "H" level at the point of time thd 4. Then, the vertical charge transfer paths $l_1$ to $l_m$ and the horizontal charge transfer path HCCD read out the pixel signals $q_{A1}$ in time series in synchronism with a predetermined drive signal to carry out the first field scanning and reading operation in a period between $t_4$ and $t_5$.

Then, pixel signals qa generated in the photodiodes B1 corresponding to the second field are field-shifted to the vertical charge transfer path side in a period in which the level of the signal FS2 is turned to an "H" level at the point of time $t_5$. Then, the vertical charge transfer paths $l_1$ to $l_m$ and the horizontal charge transfer path HCCD read out the pixel signals in time series in synchronism with a predetermined drive signal $q_{B2}$ to carry out the second field scanning and reading operation in a period between $t_5$ and $t_6$.

As described above, all the pixel signals of one picture are read out by carrying out four field scanning and reading operations just after the exposure.

However, in the case where pixel signals are scanned and read according to the timing as shown in FIG. 12, a large amount of smear contents are mixed in the pixel signals of the photodiodes corresponding to the field scanned and read just after the exposure. There arises a problem in that deterioration of picture quality is caused by field flicker produced at the time of reproducing a picture. For example, in the timing as shown in FIG. 12, a large amount of smear is mixed in the pixel signals $q_{42}$ corresponding to the third field scanned and read just after the exposure. The amount of smear mixed in the pixel signals corresponding to the fourth, first and second fields scanned and read after the third field scanning and reading period is not considerable. Accordingly, the luminance of the field picture corresponding to the third field becomes high and color irregularity occurs, thus resulting in the deterioration of picture quality.

A method for preventing the mixing of smear in the pixel signals of all fields is implemented by performing a scanning and reading operation of the vertical charge transfer paths $l_1$ to $l_m$ and the horizontal charge transfer path HCCD after the exposure to thereby exhaust out unnecessary charges which cause smear and then, subsequently, carrying out an ordinary field scanning and reading operation. The above procedure is considered as a technique of preventing the mixing of smear in pixel signals.

In the following, the method is described with reference to the timing chart of FIG. 13. When exposure is carried out at a point of time $t_4$, the transfer of pixel signals from photodiodes to the vertical charge transfer paths is prohibited by masking the field shifting operation (that is, the field shifting operation in the third field during the period $T_{MS}$ in the drawing) just after the exposure. In the period (between $t_5$ and $t_6$) for scanning and reading the original third field, a scanning and reading operation in a so-called empty reading state is performed in the vertical charge transfer paths and the horizontal charge transfer path, so that signals read out in the period (between $t_5$ and $t_6$) are aborted. As a result, smear contents in the vertical charge transfer paths and the horizontal charge transfer path are removed. Then, the fourth field scanning and reading operation is started at the point of time t to carry out the first, second and third field scanning and reading operations in order to thereby read out all the pixel signals for the four fields.

According to the scanning and reading method in the timing chart as shown in FIG. 13, the occurrence of smear can be reduced, however, the influence of dark current cannot be neglected. In short, dark current is a noise component which is always produced from surface portions of the semiconductor substrate and photodiodes. Accordingly, there is little influence of dark current on pixel signals (in FIG. 13, the pixel signals $q_{B2}$ corresponding to the fourth field) first subjected to the field scanning and reading operation, because the period in which the pixel signals stay in the photodiodes is short. Dark current has influence on pixel signals (in FIG. 13, the pixel signals $q_{42}$ corresponding to the third field) subjected to the last field scanning and reading operation, because the period in which the pixel siqnals stay in photodiodes is long. In short, in the case of FIG. 13, dark current (represented by 4I) proportional to the 4V period between t to t is mixed in the pixel signals $q_{B2}$ corresponding to the fourth field. Dark current (represented by 4I) proportional to the 4V period between $t_2$ and $t_7$ is mixed in the pixel signals $q_{41}$ corresponding to the first field. Dark current (represented by 4I) proportional to the 4V period between $t_3$ and $t_6$ is mixed in the pixel signals $q_{B1}$ corresponding to the second field. Dark current (represented by 8I) proportional to the 8V period between $t_0$ to $t_9$ is mixed in the pixel signals $q_{42}$ corresponding to the third field, because the field shifting operation is prohibited at the point of time $t_5$. As is obvious, the amount of dark current mixed in the pixel signals corresponding to the third field is larger. When a picture is reproduced on the basis of the pixel signals read out as described above, deterioration of picture quality is caused by luminance irregularity and color irregularity corresponding to the difference in the amount of mixed dark current between fields.

SUMMARY OF THE INVENTION

An object of the present invention is to provide an electronic still camera which can use a charge coupled solid-state image pickup device having a large number of pixels and which can photograph a picture and avoid the deterioration of picture quality due to flicker when reproducing the picture.

To attain the foregoing object, according to the present invention, in an electronic still camera for photographing an image using an inter-line transfer charge coupled solid-state device in which a plurality of photoelectric conversion elements corresponding to pixels are arranged in a matrix in row and column directories, vertical charge transfer paths are formed along the photoelectric conversion elements arranged in the columns respectively. A horizontal charge transfer path is formed so as to be connected to terminal portions of the respective vertical charge transfer paths. The system is controlled so as to separate the photoelectric conversion elements into k fields (k being a natural number) and successively repeat by times a field scanning and reading operation for reading out pixel signals generated in the photoelectric conversion elements arranged in each of the fields in every predetermined field scanning and reading period to thereby read out all the pixel signals.

According to a first embodiment, during photographing of an image, a scanning operation is made by means of the vertical and horizontal charge transfer paths while stopping a field shifting operation in a ki times field scanning and reading period (i being a natural number) after exposure. After the ki times field scanning and reading operations, the pixel signals generated in the photoelectric conversion elements arranged in each of the fields are read out for every predetermined field scanning and reading period, successively in order, so that all the pixel signals are read out.

In the electronic still camera of the aforementioned configuration, according to the first embodiment of the invention, the field scanning and reading operation is carried out to read out pixel signals after an empty reading operation is carried out in a period obtained by multiplying a predetermined field scanning and reading period by an integer multiple of the number of fields, after exposure. Accordingly, smear contents can be removed and the influence of dark current on pixel signals corresponding to the respective fields can be made uniform. Accordingly, the occurrence of flicker caused by the difference of luminance between fields, when reproducing a picture, can be prevented.

The number k of the fields and the coefficient i are set to about 4 and 1, respectively. In short, a technique of separating the arrangement of pixels into four fields and setting the empty reading period to be equal to the fourfields' scanning and reading period is effective for increasing image pickup speed and for reducing the absolute value of dark current for pixel signals.

According to a second embodiment, during photographing of an image, the vertical and horizontal charge transfer paths are directed to perform an empty reading operation by stopping a pixel signal field-shifting operation in the first field scanning and reading period just after exposure. Thereafter, the vertical and horizontal charge transfer paths are directed to restart and field scanning and reading operation from the field where the field shifting operation was stopped to thereby successively scan and read pixel signals corresponding to the residual fields.

In the electronic still camera of the aforementioned configuration, according to the second embodiment of the invention, the field scanning and reading operation is carried out to read out pixel signals after the empty reading operation is carried out in a field scanning and reading period after exposure. Accordingly, smear contents can be removed. Further, the field scanning and reading operation is restarted from the field where the field shifting operation is stopped, after the empty reading operation, to thereby scan and read pixel signals corresponding to the residual fields in order. Accordingly, the influence of dark current on pixel signals corresponding to each field can be made uniform to prevent the occurrence of flicker caused by the difference in luminance between fields when reproducing a picture.

Further, because the scanning and reading of pixel signals is started from the field scanning and reading operation just after the end of the empty reading operation, the period in which dark signals have influence on the pixel signals can be shortened. Accordingly, both improvement in dynamic range and improvement in the quality of a reproduced picture can be attained.

Furthermore, since the number k of fields is suitably selected, the present invention can be applied to the case where the pixels are separated into any suitable number of fields.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Brief Description of the Drawings

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
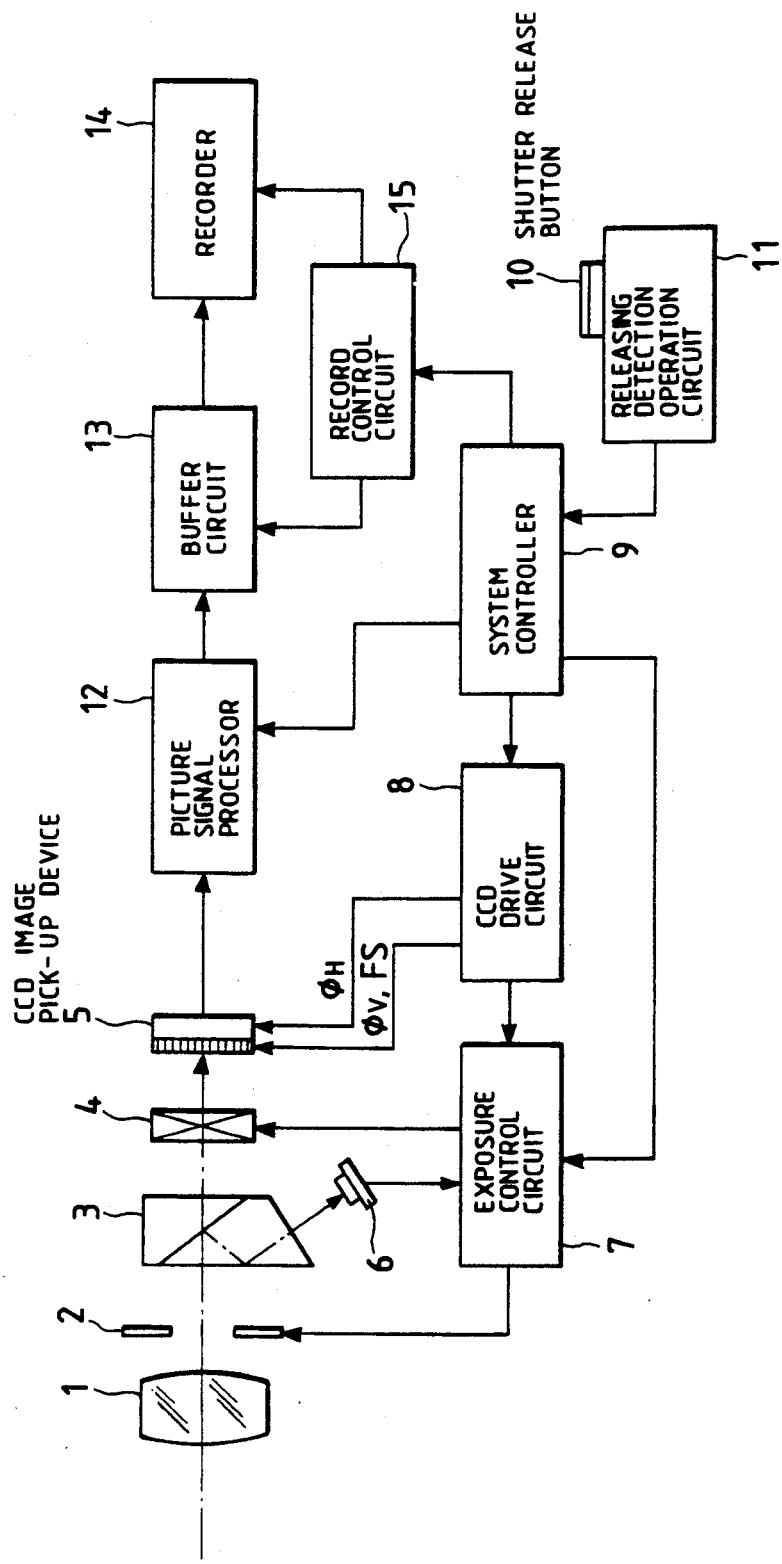
FIG. 1 is a block diagram illustrating a schematic configuration of a first embodiment of the present invention.

Referring now to FIG. 1, the schematic construction of an electronic still camera is shown. In the drawing, the reference numeral 1 designates an image pickup lens, 2 a stop mechanism, 3 a beam splitter, 4 a shutter mechanism and 5 an inter-line transfer charge coupled solid-state image pickup device. The parts are arranged in order along an optical axis.

The reference numeral 6 designates a light receiving element which measures light from the beam splitter 3 to feed an exposure control circuit 7 with a measurement signal for exhibiting the luminance of a subject. The exposure control circuit 7 serves to decide both the stop value of the stop mechanism 2 and the shutter speed of the shutter mechanism 4 automatically on the basis of the measurement signal.

Reference numeral 8 designates an image pickup device driving circuit which generates drive signals for controlling the timing of scanning and reading of the charge coupled solid-state image pickup device 5. A drive signal $\phi V$ for driving vertical charge transfer paths, a drive signal $\phi H$ for driving a horizontal charge transfer path and a field-shift synchronizing signal FS for performing a field shifting operation in each field scanning and reading period are generated by the driving circuit. Additionally, the driving circuit feeds a synchronizing signal to the exposure control circuit 7 to be synchronized with the scanning and reading timing of the charge coupled solid-state image pickup device 5.

The reference numeral 9 designates a system controller for systematically controlling the operation timing of the camera. When a synchronizing signal synchronized with the actuation of a shutter release button 10 is received from a releasing operation detection circuit the system controller 9 controls the operation of the exposure control circuit 7 and the image pickup device driving circuit 8 to be synchronized with the synchronizing signal and controls the timing of recording pixel signals read from the charge coupled solid-state image pickup device 5 in a recording medium after processing the pixel signals.

Figure 2:
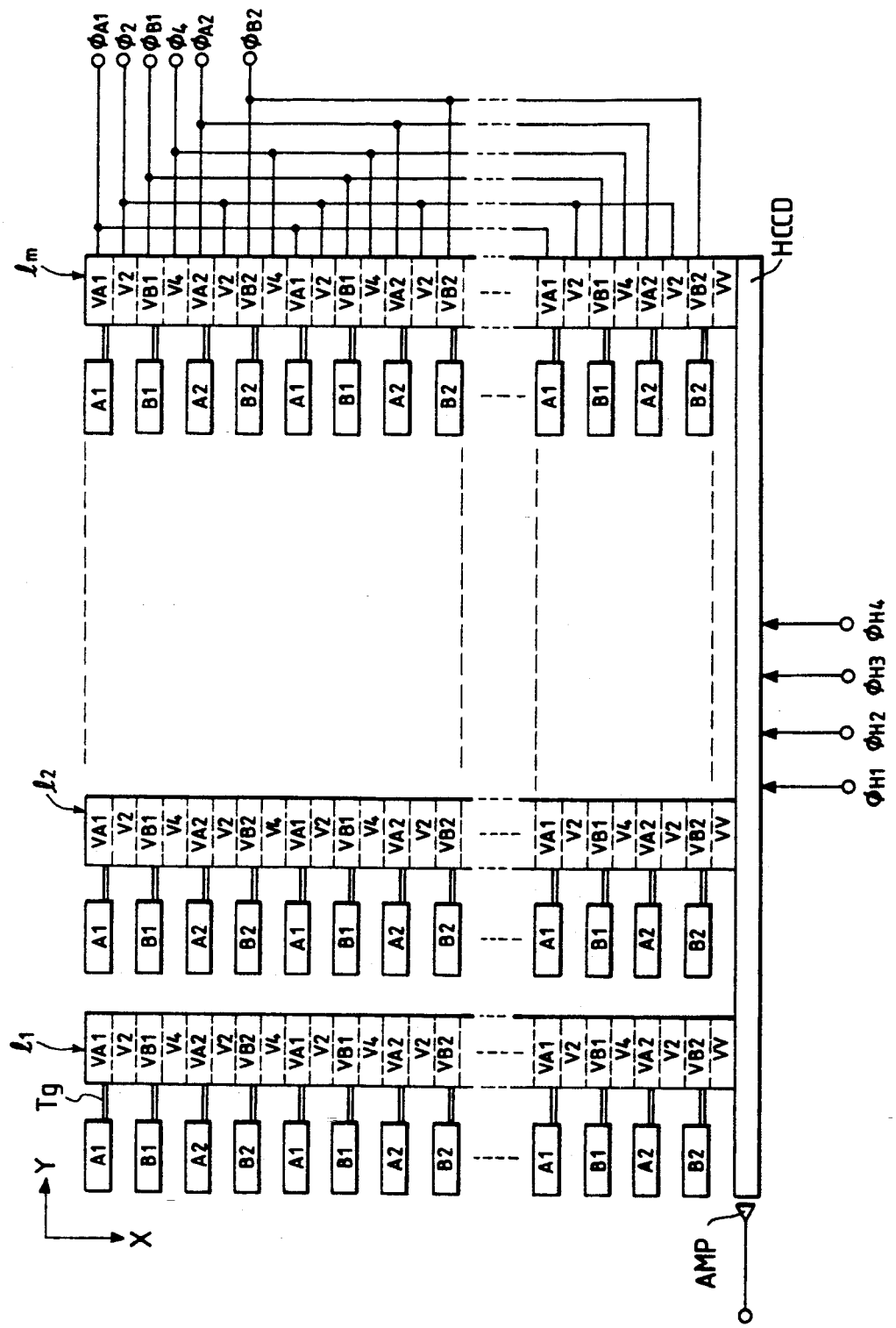
FIG. 2 is a structural view illustrating the structure of a charge coupled solid-state image pickup device used in the present invention.

In the following, the structure of the charge coupled solid-state image pickup device 5 is described with reference to FIG. 2. The image pickup device is a charge coupled solid-state image pickup device formed on a semiconductor substrate, which includes impurities with a predetermined concentration, by a semiconductor integrated circuit technique. The image pickup device has a light receiving region constituted by photodiodes A1, B1, A2 and B2 arranged in the form of a matrix corresponding to 800,000 pixels having 1000 rows in the vertical direction X and 800 columns in the horizontal direction Y. Further, the image pickup device has 800 vertical charge transfer paths $l_1$ to $l_m$ formed between photodiode arrays arranged along the vertical direction X. Gate electrodes VA1, VB1, VA2 and VB2 are provided in upper portions of each of the vertical charge transfer paths $l_1$ to $l_m$ corresponding to the (4n−3)-th photodiode A1, the (4n−2)-th photodiode B1, the (4n−1)-th photodiode A2 and the 4n-th photodiode B2, respectively. Additionally, gate electrodes V2 are provided between the gate electrodes VA1 and VB1 and between the gate electrodes VA2 and VB2. Gate electrodes V4 are provided between the gate electrodes VB1 and VA2 and between the gate electrodes VB2 and VA1.

Gate electrodes on each row are formed from a common polysilicon layer. Drive signals $\phi_{A1}$, $\phi_2$, $\phi_{B1}$, $\phi_4$, $\phi_{A2}$ and $\phi_{B2}$ are applied to the gate electrodes VA1, V2, VB1, V4, VA2 and VB2, respectively. Potential wells (hereinafter called "transfer elements") of the potential levels corresponding to the applied voltages of the drive signals $\phi_{A1}$, $\phi_2$, $\phi_{B1}$, $\phi_4$, $\phi_{A2}$ and $\phi_{B2}$ and potential barriers are produced in the vertical charge transfer paths $l_1$ to $l_m$ to thereby transfer signal charges. In FIG. 1, the drive signal $\phi_V$ is a general name for these drive signals $\phi_{A1}$, $\phi_2$, $\phi_{B1}$, $\phi_4$, $\phi_{A2}$ and $\phi_{B2}$.

Further, a horizontal charge transfer path HCCD is formed at a terminal portion of the vertical charge transfer paths $l_1$ to $l_m$. An output amplifier AMP is formed at an output end of the horizontal charge transfer path. In the horizontal charge transfer path. In the horizontal charge transfer path HCCD, pixel signals are transferred in the horizontal direction in synchronism with four-phase driving type drive signals $\phi_{H1}$, $\phi_{H2}$, $\phi_{H3}$ and $\phi_{H4}$. The pixel signals are read out from the output amplifier AMP in synchronism with the transfer period of the drive signals, that is, the timing of dot sequence. In FIG. 1, the drive signal $\phi_H$ is a general name for these drive signals $\phi_{H1}$, $\phi_{H2}$, $\phi_{H3}$ and $\phi_{H4}$.

Portions VV of the horizontal charge transfer paths $l_1$ to $l_m$ which are connected to the horizontal charge transfer path HCCD serve as gate portions for controlling the connection between transfer elements formed under the gate electrodes VB2 adjacent to the portions VV and the horizontal charge transfer path HCCD. In short, each of the gate portions VV is switched on and off in synchronism with a gate signal (not shown) in predetermined timing.

Further, transfer gates (represented by the reference symbol $T_g$) are formed between the photodiodes A1, B1, A2 and B2 and transfer elements provided under corresponding gate electrodes VA1, VB1, VA2 and VB2 in the vertical charge transfer paths. The transfer gates are switched on by applying drive signals of a predetermined high voltage to the gate electrodes VA1, VB1, VA2 and VB2 overlapped on the transfer gates, in synchronism with a field-shift synchronizing signal FS, so that a field shifting operation is carried out.

These photodiodes A1, B1, A2 and B2, transfer gates and impurity regions with a predetermined concentration formed around the vertical charge transfer paths $l_1$ to $l_m$ and the horizontal charge transfer path HCCD serve as channel stops. The photodiodes A1, B1, A2 and B2 are defined to be arranged in the first, second, third and fourth fields, respectively.

The reference numeral 12 designates a picture signal processing circuit which performs signal processing operations, such as white balance adjustment, $\gamma$ correction, and the like, on pixel signals read in predetermined timing from the charge coupled solid-state image pickup device 5. The picture signal processing circuit performs signal processing operations, such as modulation, and the like, on the signals to thereby form a recordable picture signal.

The reference numeral 13 designates a buffer circuit which amplifies a picture signal from the picture signal processing circuit 12 and transfers the amplified picture signal to a recorder 14.

Reference numeral 15 designates a record control circuit for controlling the operations of the buffer circuit 13 and the recorder 14 on the basis of the timing control signal delivered from the system controller 9 so as to direct the recorder 14 to record the picture signal in a magnetic recording medium or a semiconductor memory of a memory card.

The operation of the first embodiment of the present invention will now be described with reference to FIG. 3.

Figure 3:
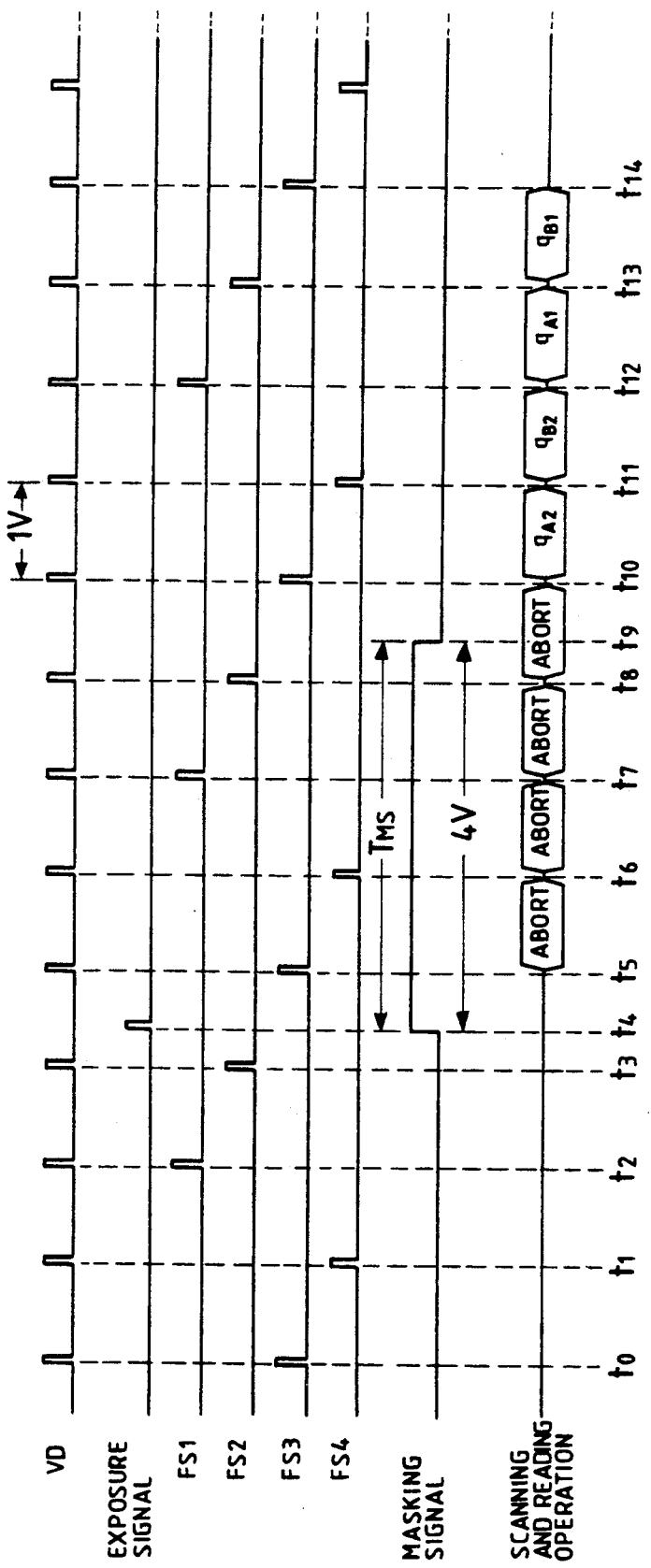
FIG. 3 is a timing chart illustrating the operation of the electronic still camera of the first embodiment during photographing of a picture.

Assuming now that the shutter release button i activated to carry out exposure at a point of time $t_4$ as shown in FIG. 3, field shifting operations are all prohibited during a masking period, which is $T_{MS}$ four times (4V) as long as a field scanning and reading period (1V), and which occurs after the point of time $t_4$. Accordingly, there is no field shifting operation at points of time $t_5$, $t_6$, $t_7$ and $t_8$. As a result, pixel signals including dark currents are preserved as they are in the photodiodes A1, B1, A2 and B2 corresponding to the fields, respectively.

Then, the vertical charge transfer paths $l_1$ to $l_m$ and the horizontal charge transfer path HCCD carry out four scanning and reading operations in a period between $t_5$ and $t_{10}$, wherein only residual charges in the vertical charge transfer paths and the horizontal transfer path are read out and aborted. Accordingly, unnecessary charges, which can produce smear, are aborted.

Then, an ordinary field scanning and reading operation is started at the point of time $t_{10}$. In short, at the point of time tm, pixel signals $q_{A2}$ of photodiodes A2 corresponding to the third field as an initial field are field-shifted to predetermined transfer elements of the vertical charge transfer paths $l_1$ to $l_m$ and read out in synchronism with drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_{H3}$ and $\phi_{H4}$ given in predetermined timing. Thus, all of the pixel signals $q_{A2}$ corresponding to the third field are read out in a period from the point of time $t_{10}$ to the point of time $t_{11}$.

When the scanning and reading operation is carried out after preserving pixel elements in photodiodes corresponding to the respective fields in the four field scanning and reading period (4V) after the exposure, dark current (represented by 8I) having influence on the photodiodes A2 in a period of 8V from the point of time $t_0$ to the point of time $t_{10}$ is mixed in pixel signals $q_{A2}$ read out in a period from the point of time $t_{10}$ to the point of time $t_{11}$. Dark current (represented by 8I) having influence on the photodiodes B2 in a period of 8V from the point of time $t_1$ to the point of time $t_{11}$ is mixed in pixel signals $q_{B2}$ read out in a period from the point of time $t_{11}$ to the point of time $t_{12}$. Dark current (represented by 8I) having influence on the photodiodes A1 in a period of 8V from the point of time $t_2$ to the point of time $t_{12}$ is mixed in pixel signals $q_{A1}$ read out in a period from the point of time $t_{12}$ to the point of time $t_{13}$. Further, dark current (represented by 8I) having influence on the photodiodes B1 in a period of 8V from the point of time $t_3$ to the point of time $t_{13}$ is mixed in pixel signals $q_{B1}$ read out in a period from the point of time $t_{13}$ to the point of time $t_{14}$. In short, dark current is uniformly mixed in pixel signals corresponding to all fields. Accordingly, flicker caused by the difference in luminance between respective fields at the time of reproduction of a picture can be prevented. Further, because smear components are aborted in the period from the point of time $t_5$ to the point of time $t_{10}$, there is no flicker caused by smear.

Figure 4:
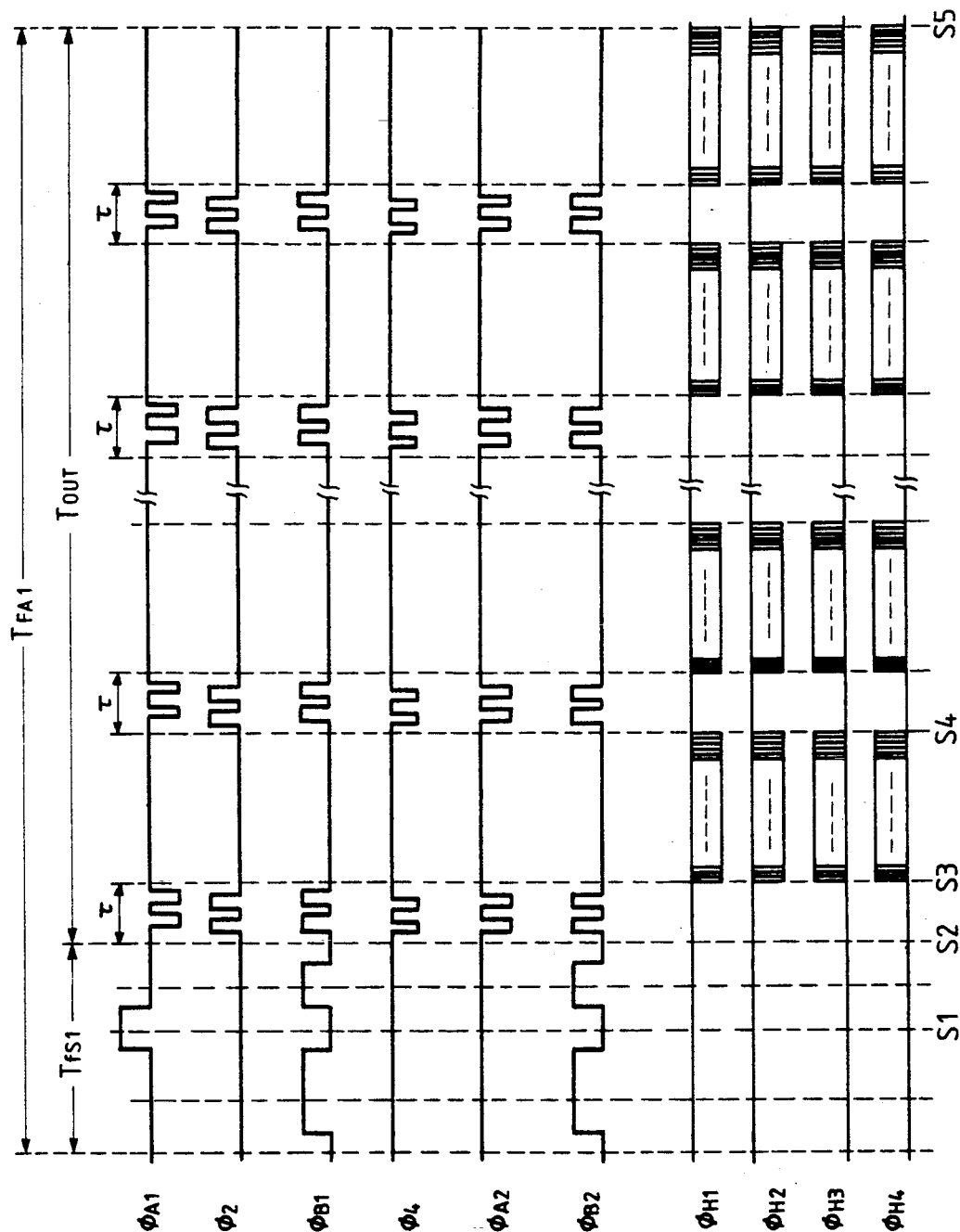
FIG. 4 is a chart illustrating the timing of scanning and reading of a first field of the charge coupled solid-state imaging device.
Figure 5:
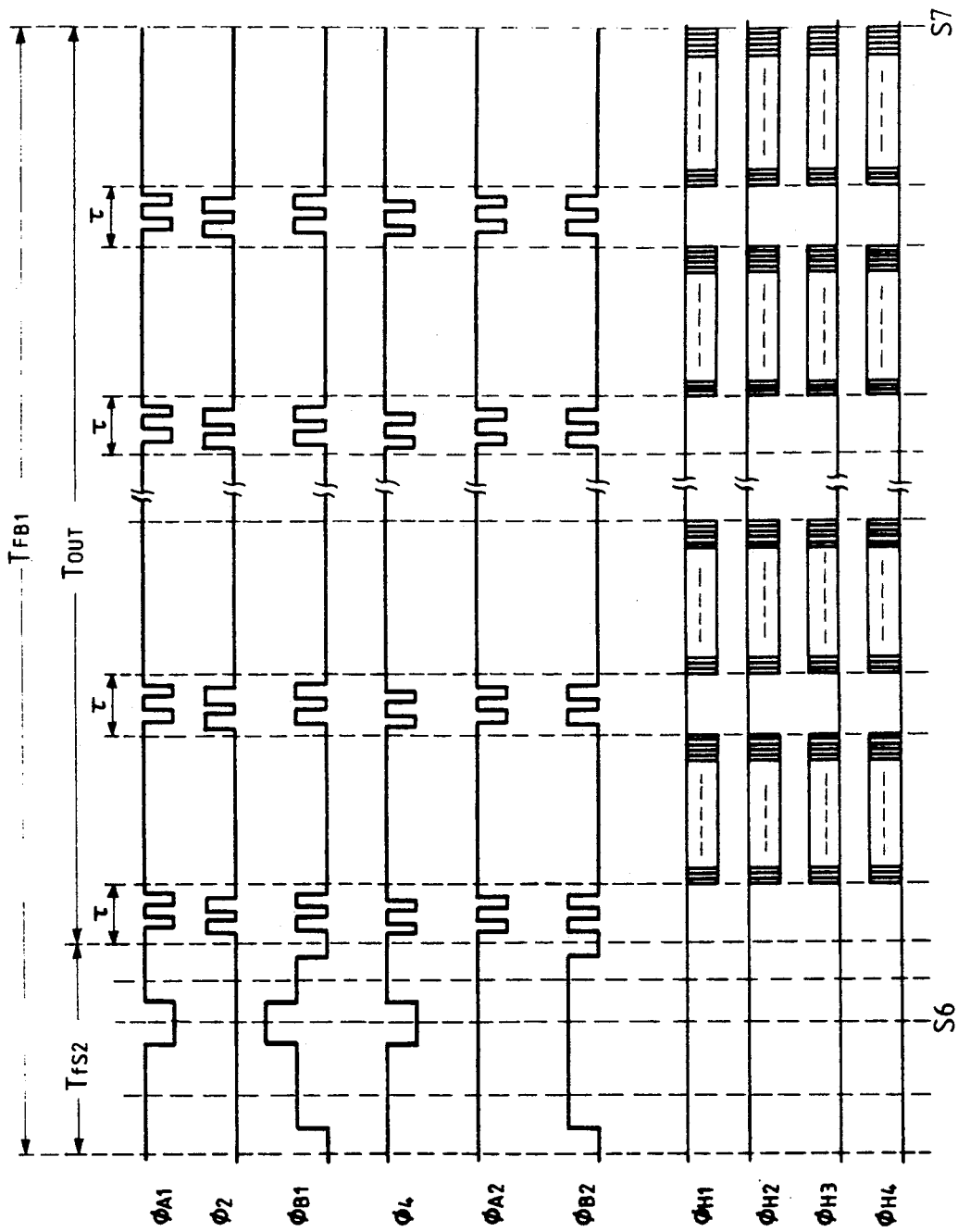
FIG. 5 is a chart illustrating the timing of scanning and reading of a second field of the charge coupled solid-state imaging device.
Figure 6:
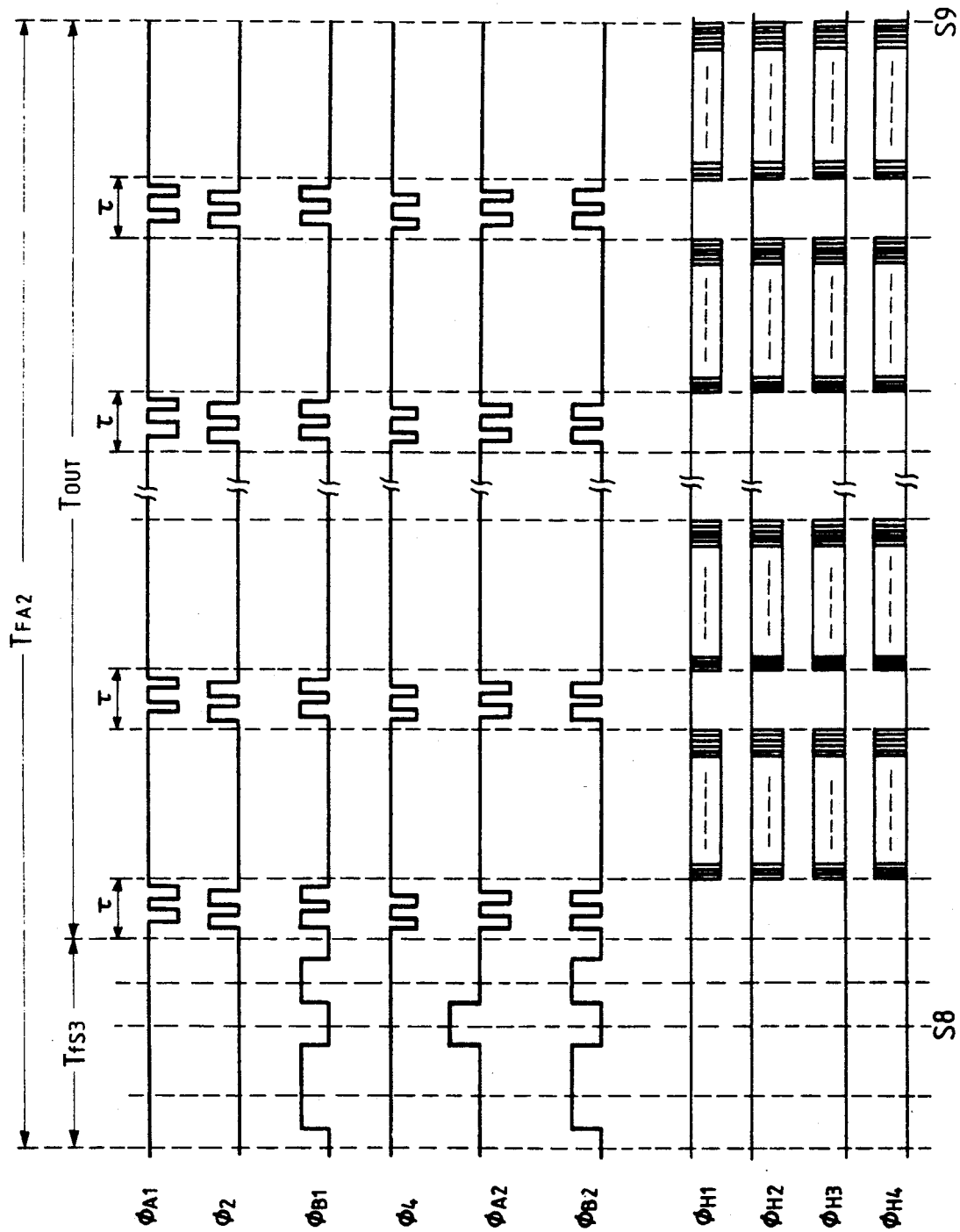
FIG. 6 is a chart illustrating the timing of scanning and reading of a third field of the charge coupled solid-state imaging device.
Figure 7:
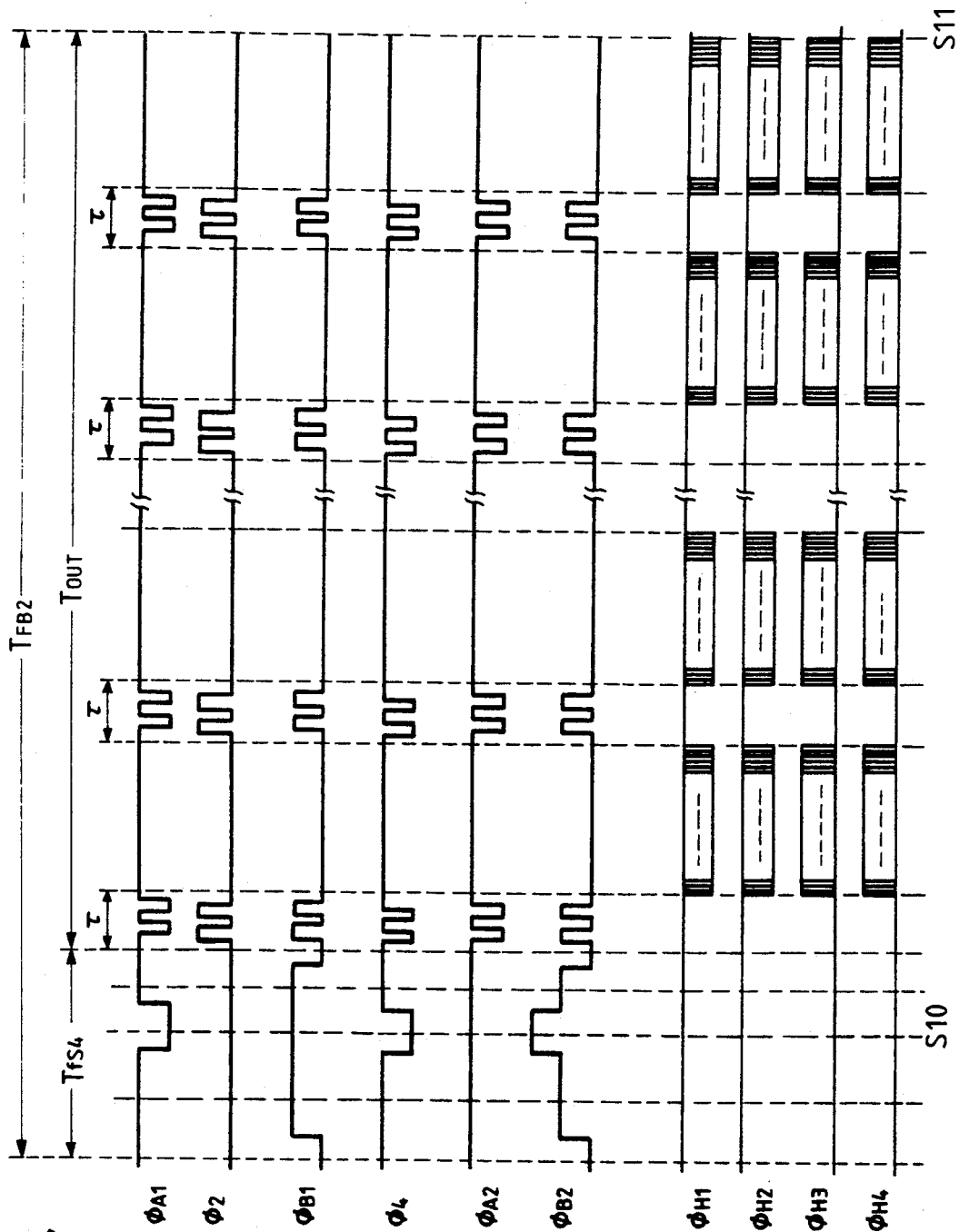
FIG. 7 is a chart illustrating the timing of scanning and reading of a fourth field of the charge coupled solid-state imaging device.
Figure 8:
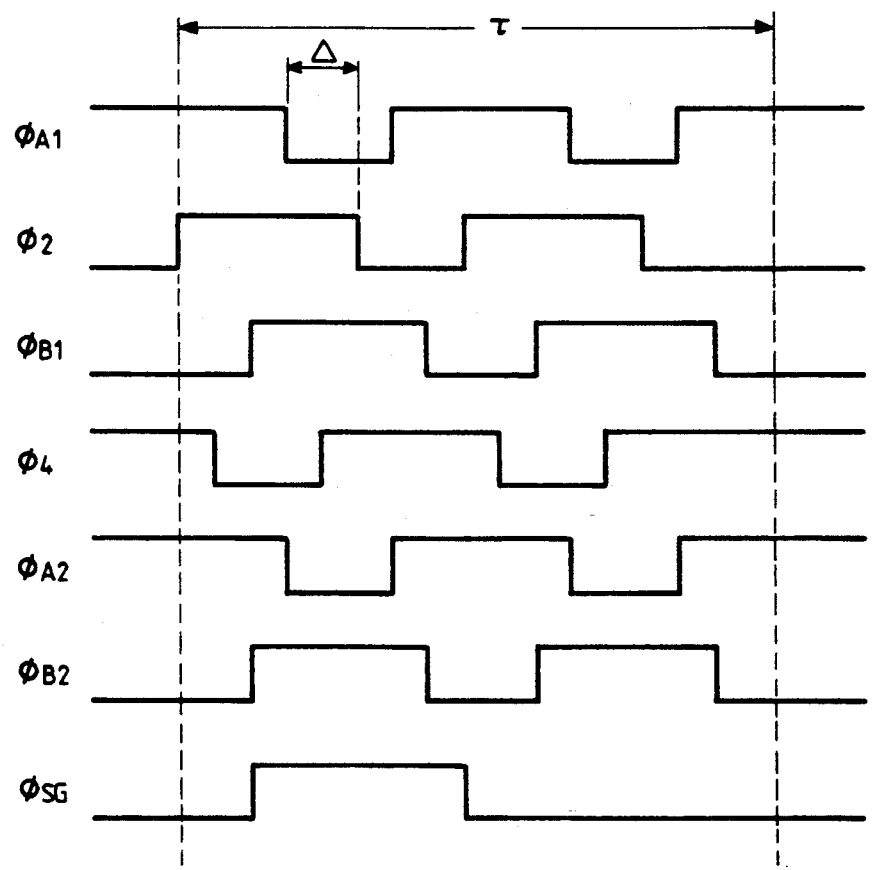
FIG. 8 is an enlarged chart illustrating the timing in the period t depicted in FIGS. 4 through 7.

Thereafter, respective field scanning and reading operations are made, as in the timing charts as shown in FIGS. 4 through 8 correspondingly, with respect to the pixels for the purpose of improving vertical resolution. FIG. 4 is a timing chart showing the first field scanning and reading operation for reading pixel signals from the photodiodes A1 corresponding to the first field. FIG. 5 is a timing chart showing the second field scanning and reading operation for reading pixel signals from the photodiodes B1 corresponding to the second field. FIG. 6 is a timing chart showing the third field scanning and reading operation for reading pixel signals from the photodiodes A2 corresponding to the third field. FIG. 7 is a timing chart showing the fourth field scanning and reading operation for reading pixel signals fro the photodiodes B2 corresponding to the fourth field. FIG. 8 is an enlarged timing chart showing the field shifting operation in a period depicted in FIGS. 4 through 7. In the drawings, each of the periods $T_{FA1}$, $T_{FB1}$, $T_{FA2}$ and $T_{FB2}$ corresponds to the field scanning and reading period (1V) and is set to 1/60 sec. Each of the periods $T_{fs1}$, $T_{fs2}$, $T_{fs3}$ and $T_{fs4}$ corresponds to the field shifting period in which the level of a corresponding one of the signals FS1, FS2, FS3 and FS4 is "H." The period $T_{out}$ represents the scanning and reading period continued after the field shifting operation.

In the following, the first field scanning and reading operation is described with reference to FIG. 4. The logical levels of the drive signals $\phi_{A1}$, $\phi_{B1}$, $\phi_{A2}$, $\phi_{B2}$, $\phi_2$ and $\phi_4$ change in the field shifting period $T_{fs1}$. When the voltage level of the drive signal $\phi_{A1}$ becomes high enough to switch on the transfer gate Tg at the point of time S1 in the drawing, pixel signals $q_{A1}$ of the photodiodes A1 corresponding to the first field are field-shifted to transfer elements under the gate electrodes VA1. After the field shifting operation, the pixel signals $q_{A1}$ in the vertical charge transfer paths $l_1$ to $l_m$ are totally transferred to the horizontal charge transfer path HCCD side by one line by carrying out an operation in the period t between the point of time S2 and he point of time S3. In short, each of the drive signals in the period t is constituted by a two-cycle rectangular signal. As shown in FIG. 8, the level of the drive signal changes successively as "H," "L," "H," "L," and "H." On the contrary, the drive signal is set to have the same waveform delayed for a predetermined phase value $\Delta$ from the drive signal $\phi_{A1}$. The drive signal $\phi$ set to have the same waveform delayed for the phase value $\Delta$ from the drive signal $\phi_2$. The drive signal $\phi_4$ is set to have the same waveform delayed for the phase value $\Delta$ from the drive signal $\phi_{B1}$. The drive signal $\phi_{A2}$ is set to have the same waveform delayed for the phase value $\Delta$ from the drive signal $\phi_4$. The drive signal $\phi_{B2}$ is set to have the same waveform delayed for the phase value $\Delta$ from the drive signal $\phi_{A2}$. When the vertical charge transfer paths $l_1$ to $l_m$ are actuated by the drive signals having the aforementioned timing, one-line's pixel signals $q_{A1}$ nearest to the horizontal charge transfer path HCCD are transferred to predetermined elements of the horizontal charge transfer path HCCD.

Then, in the period from the point of time S3 to the point of time S4, the horizontal charge transfer path HCCD horizontally transfers the one-line's pixel signals $q_{A1}$ in synchronism with the drive signals $\phi_{H1}$–$\phi_{H4}$ so that the respective pixel signs are read out in time series.

The same procedure from the point of time S2 to the point of time S4 is repeated to read out the residual pixel signals $q_{A1}$ perfectly. Thus, the operation of scanning and reading all pixel signals corresponding to the first field is terminated. In FIG. 4, the reading operation is perfected at the point of time S5.

In the following, the field scanning and reading operation for photodiodes B1 corresponding to the second field is described with reference to FIG. 5. The logical levels of the drive signals $\phi_{A1}$, $\phi_{B2}$, $\phi_{A2}$, $\phi_{B2}$, $\phi_2$ and $\phi_4$ change in the field shifting period $T_{fs2}$. When the voltage level of the drive signal $\phi_{B1}$ becomes high enough to switch on the transfer gate Tg at the point of time S6 in the drawing, pixel signals $q_{B1}$ of the photodiodes B1 corresponding to the second field are field-shifted to transfer elements under the gate electrodes VB1. After the field shifting operation, all of the pixel signals $q_{B1}$ are perfectly read out from the photodiodes B1 corresponding to the second field at the point of time S7 by carrying out the same charge transfer operation as in the period $T_{out}$ in FIG. 4.

I n the following, the field scanning and reading operation for photodiodes A2 corresponding to the third field is described with reference to FIG. 6. The logical levels of the drive signals $\phi_{A1}$, $\phi_{B1}$, $\phi_{A2}$, $\phi_{B2}$, $\phi_2$ and $\phi_4$ change in the field shifting period $T_{fs3}$. When the voltage level of the drive signal $\phi_{A2}$ becomes high enough to switch on the transfer gate Tg at the point of time S8 in the drawing, pixel signals $q_{A2}$ of the photodiodes A2 corresponding to the third field are field-shifted to transfer elements under the gate electrodes VA2. After the field shifting operation, all of the pixel signals $q_{A2}$ are perfectly read out from the photodiodes A2 corresponding to the third field at the point of time S9 by carrying out the same charge transfer operation as in the period $T_{out}$ in FIG. 4.

In the following, the field scanning and reading operation for photodiodes B2 corresponding to the fourth field is described with reference to FIG. 7. The logical levels of the drive signals $\phi_{A1}$, $\phi_{B1}$, $\phi_{A2}$, $\phi_{B2}$, $\phi_2$ and $\phi_4$ change in the field shifting period $T_{fs4}$. When the voltage level of the drive signal $\phi_{B2}$ becomes high enough to switch on the transfer gate Tg at the point of time S10 in the drawing, pixel signals $q_{B1}$ of the photodiodes B2 corresponding to the fourth field are field-shifted to transfer elements under the gate electrodes VB2. After the field shifting operation, all of the pixel signals $q_{B1}$ are perfectly readout from the photodiodes B2 corresponding to the fourth field at the point of time S11 by carrying out the same charge transfer operation as in the period $T_{out}$ in FIG. 4.

As described above, the field shifting operation in FIGS. 4 through 7 is stopped during the masking period. Accordingly, the pixel signals are preserved in the photodiodes and the unnecessary charges are then read out to be aborted by the transfer operation in the period $T_{out}$.

Although this first embodiment illustrates the case where the empty reading operation is carried out during the scanning and reading period of the four fields after th exposure, this embodiment of the invention can be applied to the case where pixel signals may be read out after carrying out the empty reading operation during a period equal to an integer multiple of the four-fields' scanning and reading period (for example, 8-fields' scanning and reading period, 12-fields' scanning and reading period, 16-fields' scanning and reading period, or the like). In short, also in the case where the empty reading operation is carried out during a period equal to an integer multiple of the four-fields' scanning and reading period, smear components can be removed and, at the same time, the influence of dark current on pixel signals corresponding to the respective fields can be made uniform.

Furthermore, even though this first embodiment has shown the case where the arrangement of photodiodes as pixels is separated into four fields in the scanning and reading operation for removing flicker, the first embodiment of the invention can be generally applied to the case where the arrangement is separated into a natural number, k, of fields and where pixel signals are read out after carrying out the empty reading operation during the (kxi)-fields' scanning and reading period. Also in this case, both removal of smear and dark current uniformity can be attained to result in the effect of preventing flicker.

Figure 9:
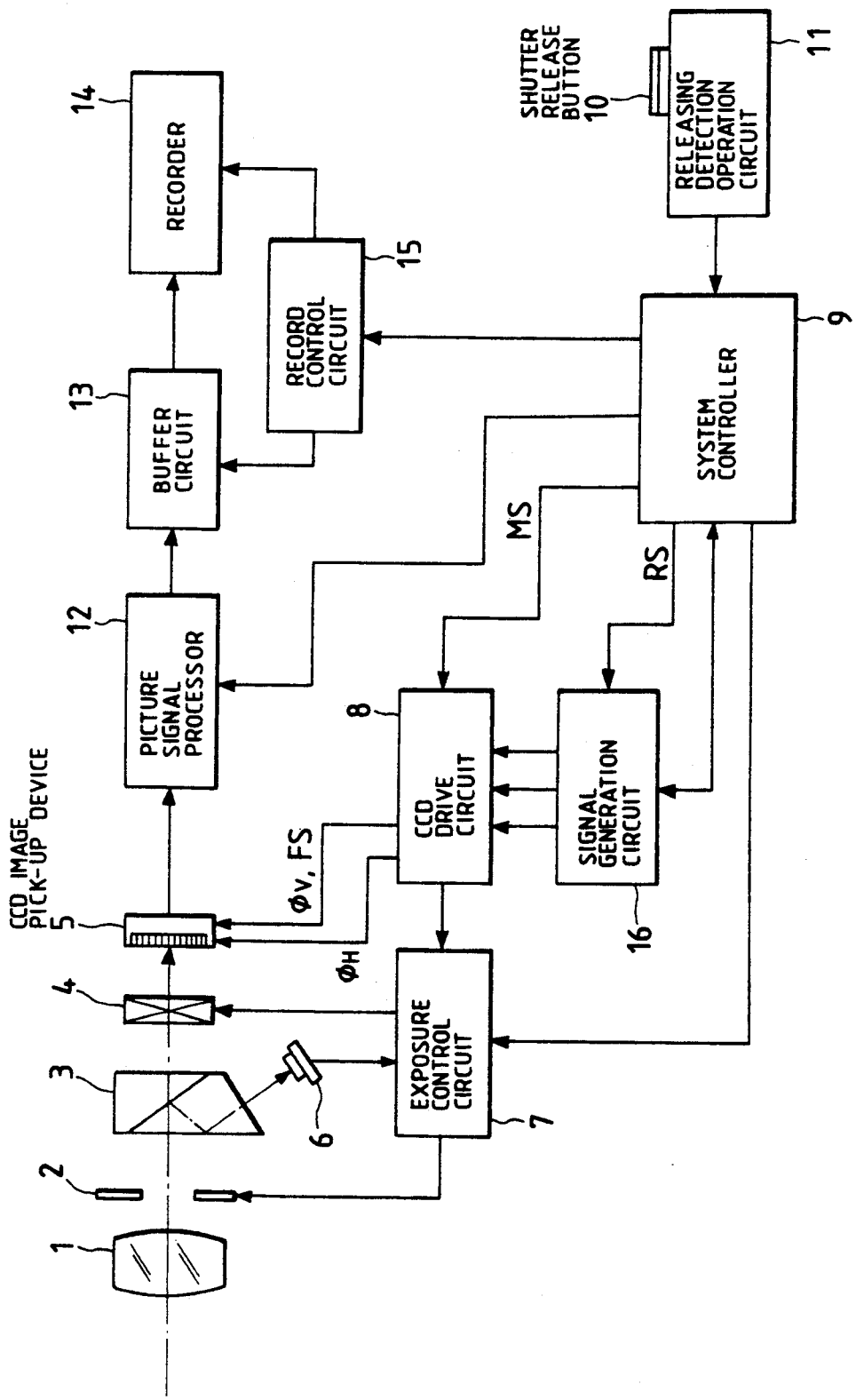
FIG. 9 is a block diagram illustrating a schematic configuration of a second embodiment of the present invention.

A second embodiment of the invention will now be described with reference to FIG. 9, wherein like elements are numbered similarly with respect to the FIG. 1 embodiment, and wherein description is omitted for the sake of brevity.

Reference numeral 16 designates a signal generation circuit which generates drive signals for controlling the scanning and reading timing of the charge coupled solid-state image pickup device 5. Generated signals are a drive signal $\phi_V$ for driving vertical charge transfer paths, a drive signal $\phi_H$ for driving horizontal charge transfer paths, a fieldshift synchronizing signal FS for performing a field shifting operation in each field scanning and reading period, and the like, and a synchronizing signal for synchronizing the operation of the exposure control circuit 7 with the scanning and reading timing of the charge coupled solid-state image pickup device 5. These signals are fed to the charge coupled solid-state image pickup device 5 and the exposure control circuit 7 through drive circuit 8.

In a manner similar to the FIG. 1 embodiment, the system controller 9 systematically controls the operation timing of the camera. When a synchronizing signal synchronized with the activation of the shutter release button 10 is received from the releasing operation detection circuit 11, the system controller 9 controls the operations of the exposure control circuit 7 and the drive circuit 8 to be synchronized with the synchronizing signal and controls the timing of recording pixel signals read from the charge coupled solid-state image pickup device 5 onto a recording medium after processing the pixel signals.

Operation of the second embodiment of the invention will now be described with reference to FIG. 10.

In the electronic still camera, pixel signals produced in the photodiodes A1, B1, A2 and B2 formed in the charge coupled solid-state image pickup device 5 are read out by successively scanning fields as described above. In FIG. 10, the cycle (1V) in which the level of the timing signal VD is high "H" is a respective field scanning period. Fields are successively shifted in synchronism with the vertical synchronizing signal VD for the purpose of scanning respective fields. When the level of the signal FS1 in FIG. 10 is "H," a field shifting operation in the first field scanning period is carried out. Similarly, when the levels of the signals FS2, FS3 and FS4 are "H," field shifting operations in the second, third and fourth field scanning periods are carried out, respectively. In FIG. 9, the signal FS is a general name for these signals FS1, FS2, FS3 and FS4.

Figure 10:
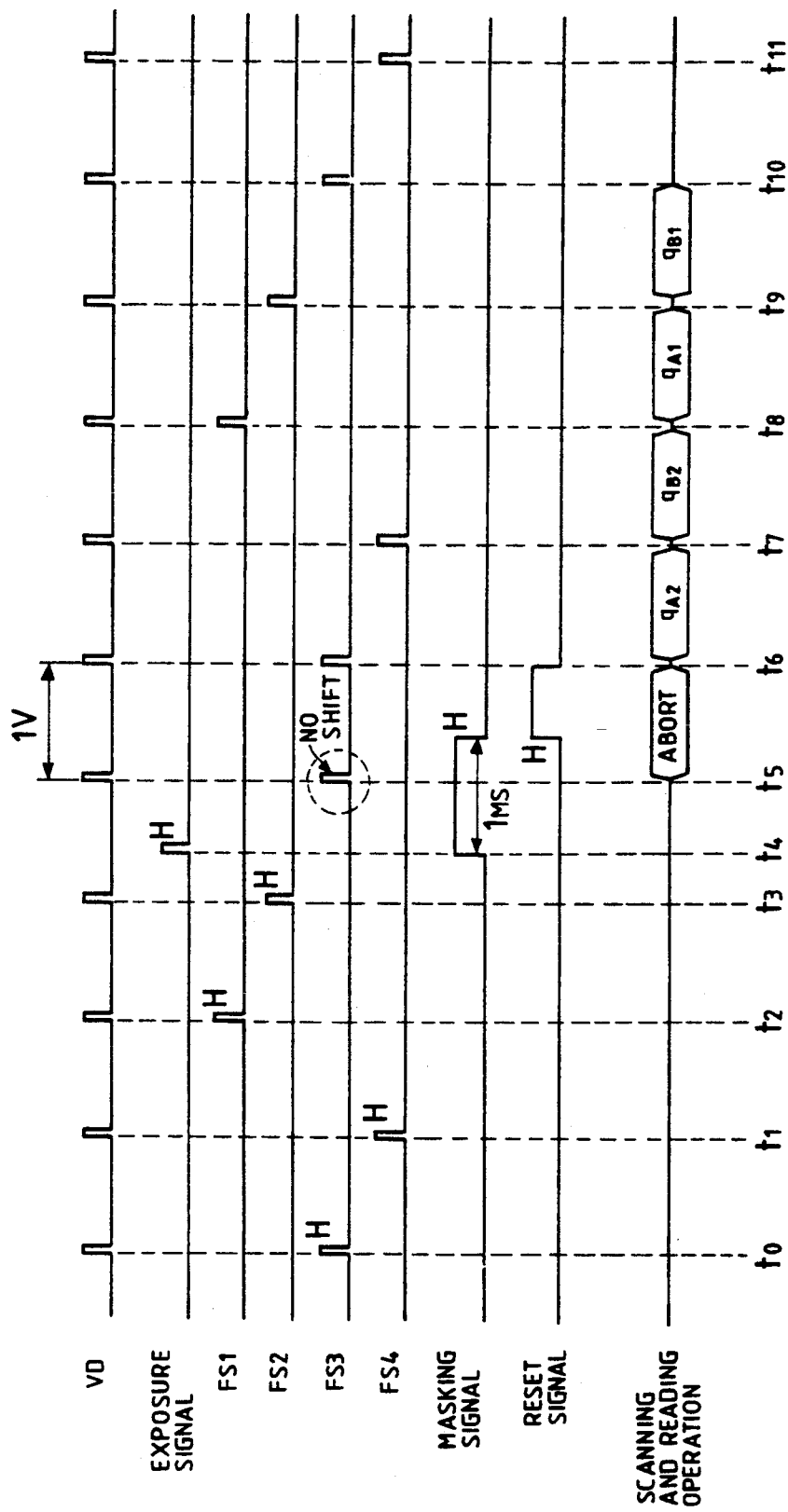
FIG. 10 is a chart illustrating the operation of the electronic still camera of the second embodiment during photographing of a picture.
Figure 11:
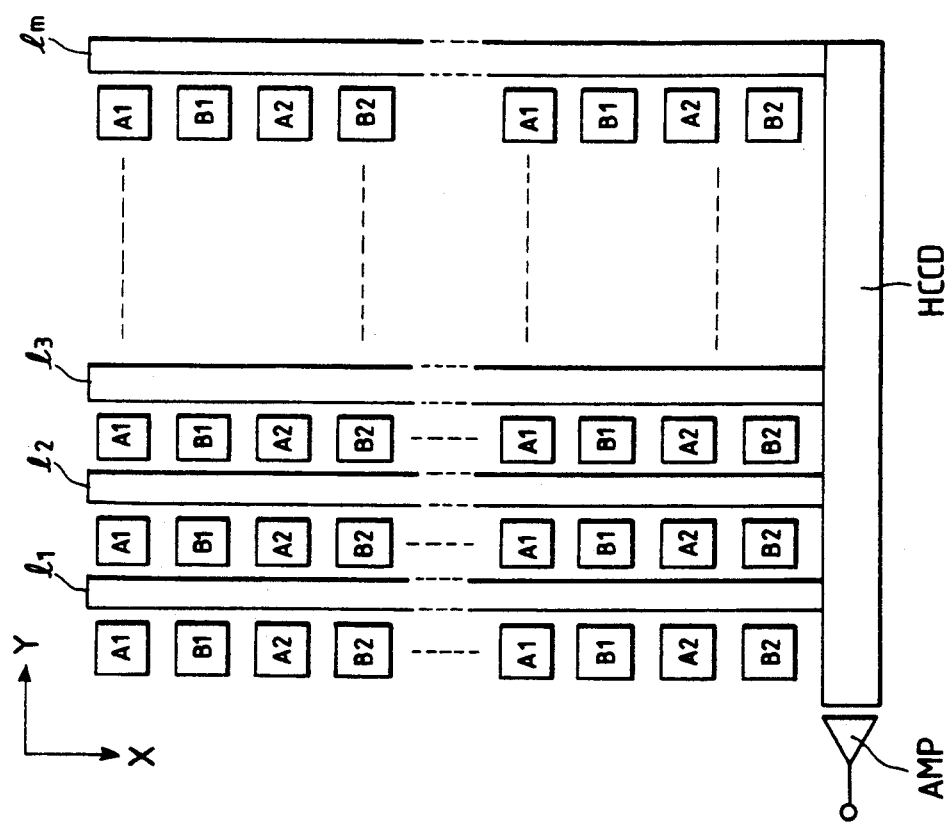
FIG. 11 is a view for considering problems in a charge coupled solid-state image pickup device used in a conventional electronic still camera.
Figure 12:
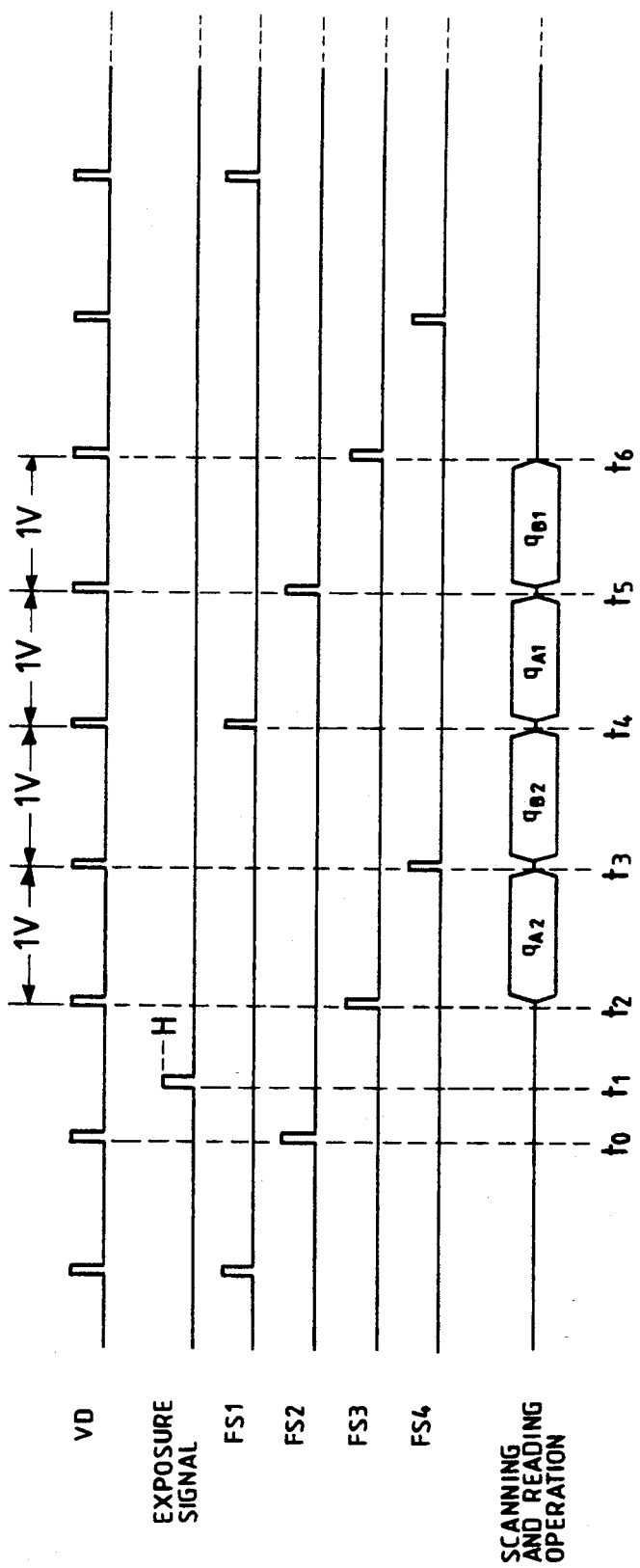
FIG. 12 is a timing chart illustrating a problem of mixing of smear in the conventional electronic still camera.
Figure 13:
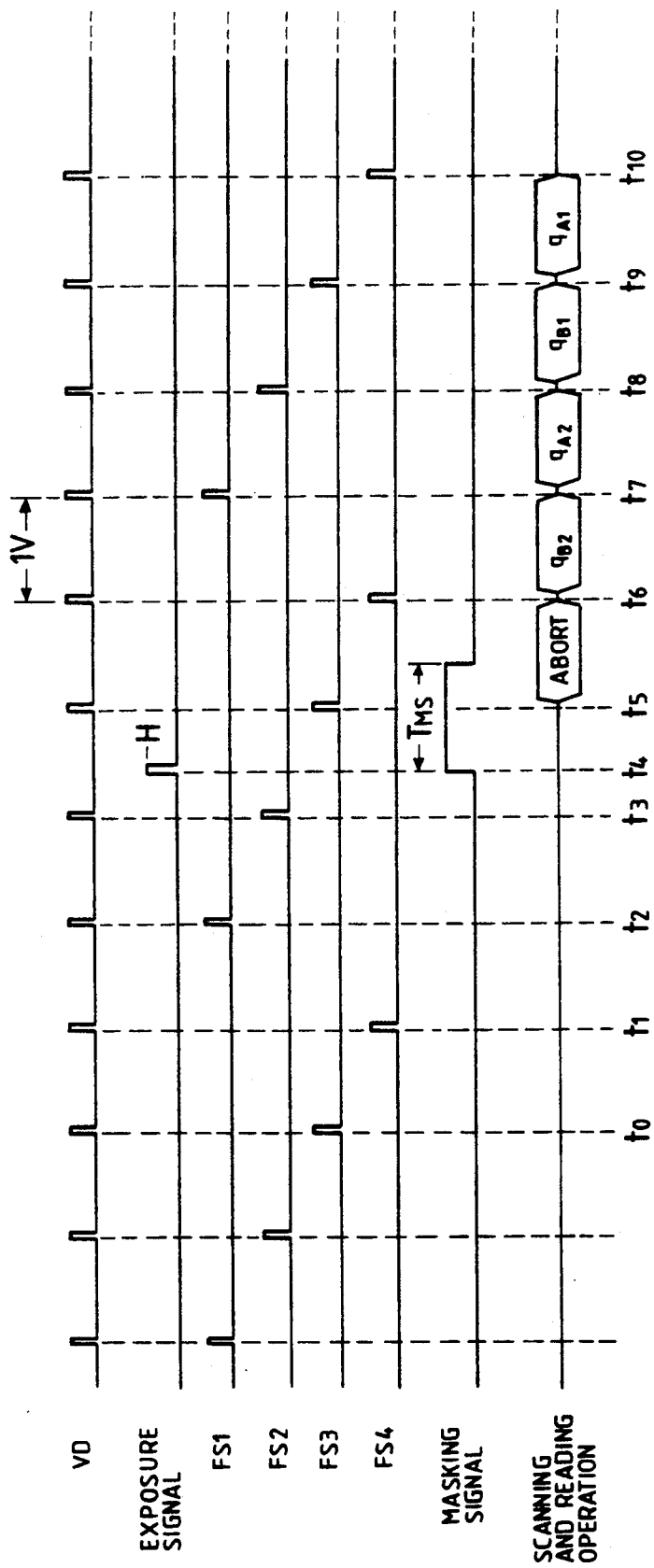
FIG. 13 is a timing chart illustrating a problem of mixing of dark current in the conventional electronic still camera.

Assuming now that the shutter release button 10 is activated to carry out exposure at a point of time $t_4$ in FIG. 10, the system controller 9 generates a mask signal MS of a logical value "H" at a point of time $T_4$ and delivers the signal MS to the drive circuit 8 in a period $T_{MS}$ substantially equal to the field scanning period (1V), to thereby prohibit the generation of a field-shift signal (FS3 in FIG. 10) in the next cycle.

Accordingly, there is no field shifting operation at a point of time $t_5$. As a result, pixel signals are preserved in the photodiodes A1, B1, A2 and B2 corresponding to the fields, respectively. Then, one scanning and reading operation is performed on the vertical charge transfer paths $l_1$ to $l_m$ and the horizontal charge transfer path HCCD in a period from a point of time $t_5$ to a point of time $t_6$. All the signals read in this period are aborted.

In short, unnecessary charges which may cause smear can be aborted by performing a so-called empty reading operation on the transfer paths only, while preserving pixel signals respectively in predetermined photodiodes.

As shown in the drawing, the system controller 9 supplies a reset signal RS of a logical value "H" to the signal generation circuit 16 at a point of time synchronized with the point of time $t_5$. As a result, the signal generation circuit 16 restarts the field shifting operation (FS3 in FIG. 10) masked at the point of time $t_5$, at a point of time $t_6$ when the level of the next pulse of the synchronizing signal VD is turned to "H." Thereafter, field shifting operations are repeated in predetermined order.

In short, photodiodes $q_{A2}$ corresponding to the third field are field-shifted to predetermined transfer elements of the vertical charge transfer paths $l_1$ to $l_m$ in a period in which the level of signal FS is "H" at the point of time $t_6$. Then, all of the pixel signals $q_{A2}$ corresponding to the third field are read out in a period from the point of time t to the point of time $t_7$ in synchronism with drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_{H3}$, and $\phi_{H4}$ generated in predetermined timing.

Then, at the point of time $t_7$, pixel signals $q_{B2}$ of photodiodes B2 corresponding to the fourth field are field-shifted to predetermined transfer elements of the vertical charge transfer paths $l_1$ to $l_m$ and red out in synchronism with drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_{H3}$ and $\phi_{H4}$ generated in predetermined timing. Thus, all of the pixel signals $q_{B2}$ corresponding to the fourth field are rad out in a period from the point of time t$_7$ to the point of time t$_8$.

Then, at the point of time t$_8$, pixel signals q$_{A1}$ of photodiodes B2 corresponding to the fourth field are field-shifted to predetermined transfer elements of the vertical charge transfer paths l$_1$ to l$_m$ and read out in synchronism with drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_{H3}$ and $\phi_{H4}$ generated in predetermined timing. Thus, all of the pixel signals q$_{A1}$ corresponding to the fourth field are read out in a period from the point of time t$_8$ to the point of time t$_9$.

Finally, at the point of time t$_9$, pixel signals q$_{B1}$ of the photodiodes B1 corresponding to the second field are field-shifted to predetermined transfer elements of the vertical charge transfer paths l$_1$ to l$_m$ and read out in synchronism with drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_{H3}$ and $\phi_{H4}$ generated in predetermined timing. Thus, all of the pixel signals q$_{B1}$ corresponding to the second field are readout in a period from the point of time t$_9$ to the point of time t$_{10}$.

The pixel signals readout as described above are finally recorded onto a predetermined recording medium in the recorder 15.

In short, smear contents in the vertical charge transfer paths l$_1$ to l$_m$ and the horizontal charge transfer path HCCD can be aborted by execution of a scanning and reading operation on the paths while preserving pixel elements in photodiodes corresponding to respective fields by stopping the field shifting operation once just after the end of exposure.

Further, the influence of dark current on pixel elements corresponding to the respective fields can be made uniform by restarting the field shifting operation to successively carry out the field scanning and reading operations in synchronism with the vertical synchronizing signal VD after the abortion of smear contents. In short, dark current (represented by 5I) having influence on the photodiodes A2 in a period of 5V from the point of time t$_0$ to the point of time t$_6$ is mixed in pixel signals q$_{A2}$ read out in a period from the point of time t$_6$ to the point of time t$_7$. Dark current (represented by 5I) having influence on the photodiodes B2 in a period of 5V from the point of time t$_1$ to the point of time t$_7$ is mixed in pixel signals q$_{B2}$ read out in a period from the point of time t$_7$ to the point of time t$_8$. Dark current (represented by 5I) having influence on the photodiodes Ai in a period of 5V from the point of time t$_2$ to the point of time t$_8$ is mixed in pixel signals q$_{A1}$ read out in a period from the point of time t$_8$ to the point of time t$_9$. Further, dark current (represented by 5I) having influence on the photodiodes B1 in a period of 5V from the point of time t$_3$ to the point of time t$_9$ is mixed in pixel signals q$_{B1}$ read out in a period from the point of time t$_9$ to the point of time t$_{10}$. In short, dark current 5I is uniformly mixed in pixel signals corresponding to all fields. Accordingly, flicker caused by the difference in luminance between respective fields at the time of reproduction of a picture can be prevented. Further, because smear contents are aborted in the time period from the point of time t: to the point of time t$_6$, there is no flicker caused by smear.

Additionally, since desired pixel signals are scanned and read just after aborting smear contents in the one-field scanning and reading period after the exposure, the absolute value of dark current mixed in the pixel signals can be reduced to thereby resulting an effect of improving the dynamic range, picture quality and the like.

Thereafter, respective field scanning and reading operations are performed, as set forth and described with reference to FIGS. 4 to 8.

When the vertical charge transfer paths l$_1$ to l$_m$ are actuated by six-phase drive signals $\phi_{A1}$, $\phi_{B1}$, $\phi_{A2}$, $\phi_{B2}$, $\phi_2$ and $\phi_4$ as described above, the drive signals can be reduced in kind. There arises an effect in that the image pickup device driving circuit 8 can be simplified in construction and wiring structure. If the conventional four-phase driving method used generally is applied to the image pickup device having vertical resolution increased by twice than originally, an eight-phase driving system is required, that is, eight kinds of drive signals are required. On the contrary, this embodiment has the aforementioned effect because the six-phase driving system can be used.

Although this second embodiment has set forth the case where the arrangement of photodiodes as pixels is separated into four fields in the scanning and reading operation for removing flicker, the invention can be generally applied to the case where arrangement is separated into a natural number, k, of fields. Also in this case, both removal of smear and uniformity of dark current can be attained to result in the effect of preventing flicker.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging apparatus comprising:

imaging means, for generating pixel signals, including a matrix of photodiode elements of a plurality of rows and columns grouped in fields, a horizontal charge transfer line, and a plurality of vertical charge transfer lines, equal in number to said plurality of columns, coupled to said photodiode elements and transferring said pixel signals to said horizontal charge transfer line;

imaging drive means, coupled to said imaging means, for generating field shift synchronizing signals which control transfer operation of said pixel signals from said photodiode elements within said imaging means; and system control means, coupled to said imaging drive means and a shutter release detection means, for controlling said imaging drive means to begin field shift operation upon receipt of a shutter release signal from said shutter release detection means, said system control means further generating a masking signal of a predetermined period synchronized with a start of said field shift operation to prevent shifting of said pixel signals from said photodiode elements to said vertical charge transfer lines so that only residual charges are read out from said vertical and horizontal charge transfer lines during an empty reading period to prevent the occurrence of smear, said predetermined period of said masking signal selected so that equal amount of generated dark current are uniformly mixed with said pixel signals of each respective field.

2. The imaging apparatus of claim 1, said pixel signals of each of said fields are read from said horizontal charge transfer line during respective field scanning and reading periods of equal duration V, said predetermined period of said masking signal being of a duration 4V.

3. The imaging apparatus of claim 2, said dark currents uniformly mixed with said pixel signals of each respective field are generated during corresponding periods of duration 8V from generation of respective field shift synchronizing signals to starting of said field scanning and reading periods.

4. The imaging apparatus of claim 3, said photodiode elements being grouped into four fields.

5. The imaging apparatus of claim 4, said empty reading period being of a duration V.

6. The imaging apparatus of claim 5, the apparatus being an electronic still camera.

7. The imaging apparatus of claim 1, said photoelectric elements are grouped into k fields and said pixel signals of said photodiode elements of each of said k fields are read from said horizontal charge transfer line during k respective field scanning and reading operations, k being a positive integer.

8. The imaging apparatus of claim 6, said predetermined period of said masking signal of duration equal to k respective field scanning and reading operations.

9. The imaging apparatus of claim 1, said photoelectric elements are grouped into k fields, k being a positive integer, said empty reading period of duration equal to ki scanning and reading operations, i being a positive integer.

10. The imaging apparatus of claim 1, said imaging means being an inter-line transfer charge coupled solid-state device.

11. The image apparatus of claim 1 wherein said system control means is further operable to generate a reset signal sychronized with the end of generation of said masking signal, to direct restart of said field shift operation of said pixel signals from said next corresponding field.

12. An electronic still camera comprising:
inter-line transfer charge coupled solid-state means including a plurality of photoelectric conversion elements corresponding to pixels arranged in a matrix in row and column directions, vertical charge transfer paths being formed along said photoelectric conversion elements arranged in said columns respectively, and a horizontal charge transfer path being formed as connected to terminal portions of said respective vertical charge transfer paths; and
control means, coupled to said inter-line transfer charge coupled solid-state means, for controlling operation by separating said photoelectric conversion elements into k fields, k being a natural number, and successively repeating a field scanning and reading operation of pixel signals generated in said photoelectric conversion elements arranged in each of said fields by k times to read out all of said pixel signals,
said control means directs an empty reading operation of said vertical and horizontal charge transfer paths during photographing operation by stopping a pixel signal field-shifting operation in a first field scanning and reading period just after exposure and restarting said field scanning and reading operation from a field where said pixel signal field-shifting operation was stopped to successively scan and read unwanted pixel signals corresponding to residual fields.

13. An electronic still camera comprising:
inter-line transfer charge coupled solid-state means including a plurality of photoelectric conversion elements corresponding to pixels arranged in a matrix in row and column directions, vertical charge transfer paths being formed along said photoelectric conversion elements arranged in said columns respectively, and a horizontal charge transfer path being formed as connected to terminal portions of said respective vertical charge transfer paths; and
control means, coupled to said inter-line transfer charge coupled solid-state means, for controlling operation by separating said photoelectric conversion elements into k fields, k being a natural number, and successively repeating a field scanning and reading operation of pixel signals generated in said photoelectric conversion elements arranged in each of said fields by k times to read out all of said pixel signals,
said control means directs an empty reading operation of said vertical and horizontal charge transfer paths during photographing operation while stopping a field shifting operation during ki times field scanning and reading periods just after exposure, i being a natural number, and wherein after said empty reading operation, said pixel signals generated in said photoelectric conversion elements arranged in each of said fields are read out,
said control means further generating a masking signal of a predetermined period synchronized with a start of a field shift operation to prevent shifting of the pixel signals from the photodiode elements to the vertical charge transfer lines so that only residual charges are read from the vertical and horizontal charge transfer lines during an empty reading period to prevent the occurrence of smear, said predetermined period of said masking signal selected so that equal amounts of generated dark current are uniformly mixed with said pixel signals of each respective field.

14. An imaging apparatus comprising:
imaging means, for generating pixel signals, including a matrix of photodiode elements of a plurality of rows and columns, grouped in fields, and vertical charge transfer lines, equal in number to said plurality of columns, coupled to said photodiode elements for transferring said pixel signals to a horizontal charge transfer line;
imaging drive means, coupled to said imaging means, for generating field shift synchronizing signals which control transfer operation of said pixel signals from said photodiode elements within said imaging means; and
system control means, coupled to said imaging drive means and a shutter release detection means, for controlling said imaging drive means to begin field shift operation upon receipt of a shutter release signal from said shutter release detection means, said system control means further generating a masking signal of a predetermined period synchronized with a start of said field shift operation to prevent shifting of said pixel signals from said photodiode elements of a next corresponding field to said vertical charge transfer lines so that only residual charges are read out from said vertical and horizontal charge transfer lines during an empty reading period to prevent the occurrence of smear, said system control means further operable to generate a reset signal synchronized with the end of generation of said masking signal, to direct restart of said field shift operation of said pixel signals from said next corresponding field so that equal amounts of dark current are uniformly mixed with said pixel signals of each respective field.

15. The imaging apparatus of claim 14, said pixel signals of each of said fields are read from said horizontal charge transfer line during respective field scanning and reading periods of equal duration V, said predetermined period of said masking signal also of duration V.

16. The imaging apparatus of claim 15, said empty reading period of duration V.

17. The imaging apparatus of claim 15, said dark currents uniformly mixed with said pixel signals of each respective field are generated during corresponding periods of duration 5V from generation of respective field shift synchronizing signals to starting of said field scanning and reading periods.

18. An imaging method for use with an imaging means including a matrix of photodiode elements of a plurality of rows and columns, grouped in fields, and vertical charge transfer lines equal in number to said plurality of columns and coupled to the photodiode elements for transferring the pixel signals to a horizontal charge transfer line, the method comprising the steps of:
   successively shifting pixel signals from the photodiode elements of the fields to said vertical and horizontal charge transfer lines upon receipt of a shutter release signal from a shutter release detection means;
   generating a masking signal of a predetermined period, in a control means, which prevents shifting of the pixel signals from the photodiode elements within the imaging means at the onset of said shifting step so that only residual charges are read from the vertical and horizontal charge transfer lines during an empty reading period to prevent the occurrence of smear; and
   reading the pixel signals of the photodiode elements of the fields from the horizontal charge transfer line after completion of the empty reading period to generate an image,
   the predetermined period is selected so that equal amounts of dark current are uniformly mixed with the pixel signals of each respective field.

19. The imaging method of claim 18 and additionally including the step of generating a reset signal, in said control means, synchronized with an end of generation of the masking signal to restart said shifting step from said next corresponding shifting step prior to the step of reading the pixel signals.

20. An imaging method for use with an imaging means including a matrix of photodiode elements of a plurality of rows and columns, grouped in fields, and vertical charge transfer lines equal in number to said plurality of columns and coupled to the photodiode elements for transferring the pixel signals to a horizontal charge transfer line, the method comprising the steps of:
   successively shifting pixel signals from the photodiode elements of the fields to said vertical and horizontal charge transfer lines upon receipt of a shutter release signal from a shutter release detection means;
   generating a masking signal, of predetermined period, in a control means, which prevents shifting of the pixel signals from the photodiode elements of a next corresponding shifting step designated to occur immediately after receipt of the shutter release signal so that only residual charges are read from the vertical and horizontal charge transfer lines during an empty reading period to prevent the occurrence of smear; and
   generating a reset signal, in said control means, synchronized with an end of generation of the masking signal, to restart said shifting step from said next corresponding shifting step so that equal amounts of dark current are uniformly mixed with the pixel signals of each respective field.

* * * * *